3,330,327
DRYING TERTIARY AMINE OXIDES ON EXTENDED HEATED SURFACES AT ELEVATED TEMPERATURES
Eugene F. Kennedy and Kenneth E. Harwell, Ponca City, Okla., assignors to Continental Oil Company, Ponca City, Okla., a corporation of Delaware
No Drawing. Filed Mar. 30, 1964, Ser. No. 355,941
7 Claims. (Cl. 159—49)

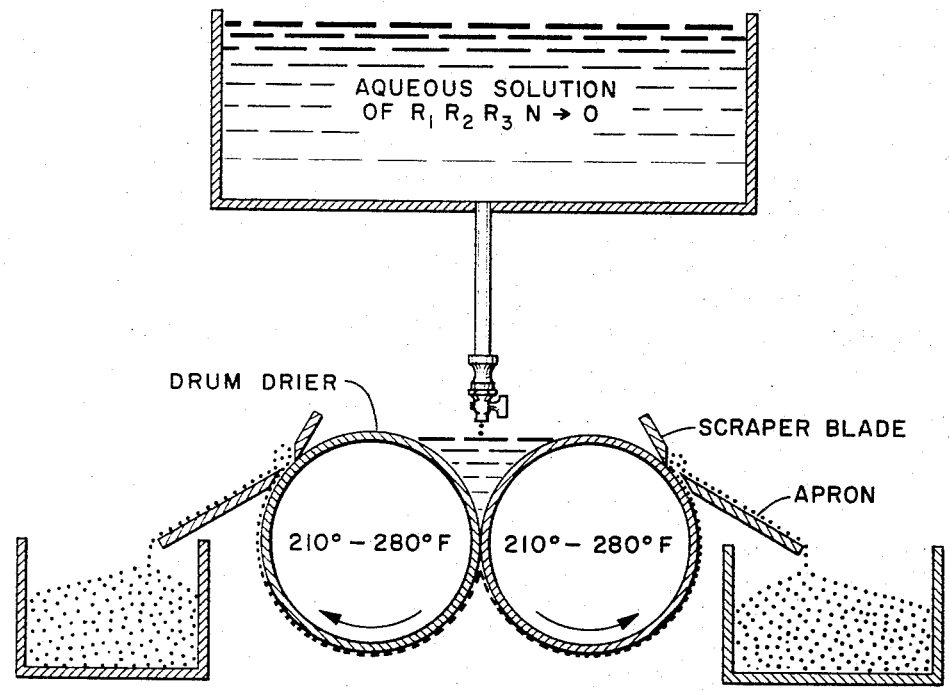

This invention relates to a method for drying aqueous solutions of heat sensitive compounds. More specifically, the present invention concerns a commercially applicable method for dehydrating an aqueous solution of a detergent grade aliphatic tertiary amine oxide to yield a physically dry free flowing form thereof.

The aliphatic tertiary amine oxides with which this invention is concerned are extremely effective water-soluble surfactants. They are versatilely adapted to be used either as the active cleansing agent or as a foam stabilizing agent in both heavy-duty and light-duty detergent compositions. These oxides are derived from tertiary amines having two lower alkyl groups, usually either methyl or ethyl, and one long-chain linear alkyl group as substituents of the nitrogen atom. Of this class of amine oxides, the ones exhibiting the most effective surface active properties are those in which the long-chain linear alkyl group contains from about 8–20 carbon atoms and preferably from about 10–16 carbon atoms. Desirably, the higher alkyl substituent should be attached to the nitrogen atom via a terminal carbon atom in order to provide an oxide derivative exhibiting optimum surface active properties.

The amine oxide surfactants described above are obtained by oxidation of the corresponding aliphatic tertiary amine. This conversion is generally accomplished by adding aqueous hydrogen peroxide to the amine directly or more usually to a solution of the amine in water. Sometimes a minor amount of alcohol or other appropriate solvent is included in the solution of the amine to be oxidized. Perhydration of the amine occurs as the first step, followed by the elimination of water to give the N-oxide. The reaction product is normally a 20–30 percent solution of amine oxide.

While the aqueous solution of amine oxide can be used as such in the formulation of liquid detergents, it is nevertheless desirable to concentrate these solutions so that they can be shipped economically. In order to use these amine oxides in heavy-duty detergent compositions, however, it is essential in most instances that the amine oxide exist in a free-flowing powder form so that it can be satisfactorily blended with the other solid ingredients making up the heavy-duty composition. To achieve either suitably dehydrated solutions for shipping purposes or the satisfactorily dehydrated materials for use in heavy-duty detergent compositions has heretofore proven to be difficult. The conventional solvent removal techniques, such as the customary thermal evaporative method, is of no avail since such a procedure ultimately results in producing only huge volumes of stable foam. A departure from the latter method has been suggested for effectively concentrating the relatively dilute aqueous solutions of the amine oxide. This method involves gently heating the surface of a shallow pool of the amine oxide solution, either by radiant or convection heat transmission, to effect the formation of a gelatinous skin on the surface thereof. The resultant skins are periodically removed to provide a semi-solid gel concentrate of the amine oxide containing from about 65 to 85 percent solids. This technique, although useful, unfortunately is not adapted to provide a satisfactorily dehydrated product capable of being employed in heavy-duty detergent compositions.

In copending application Serial No. 283,689, filed May 28, 1963, a method is disclosed and claimed for preparing dry heavy-duty detergent compositions containing as a component the amine oxides with which this present invention is concerned. In accordance with the invention set forth in the aforesaid patent application, aqueous slurries of heavy-duty detergent compositions containing the heat sensitive amine oxide are dried to a state of apparent complete dehydration using either the drum drying or spray drying method while observing drying temperatures considerably in excess of the decomposition temperature of the amine oxide component. The foregoing method represents a substantial advance in the art, but on the other hand falls short of the ultimate objective, namely, of being able to supply the detergent manufacturers as well as other consumers with an anhydrous product.

In accordance with the present invention we have provided a method for commercially drying dilute aqueous solutions of the heat sensitive detergent type amine oxides so as to result in a physically dry free-flowing form of the oxide. Underlying the concept of this invention is the recognition that the amine oxides herein concerned form a monohydrate, or at least a relatively stable complex composed of a molecule of the amine oxide and about a molecule of water, which complex is a physically dry material unexpectantly more stable toward elevated temperatures than is the anhydrous form of the oxide. In carrying out the process of this invention a thin layer or film of the dilute amine oxide solution is applied to an extended surface maintained at a satisfactorily high temperature, usually within the range of about 210°–280° F. This heat transfer relationship is continued until the dried material corresponds to about a monohydrate of the particular amine oxide involved. For the detergent range amine oxides described hereinabove, the amount of water contained by the dried product will be from about 4–7 percent by weight. As will be shown in the working examples to follow, it is not necessary to carry out the dehydration to effect precisely the formation of a monohydrate. Those amine oxides with which is associated somewhat less than a molecule of water or somewhat more than a molecule of water will be satisfactorily dry materials and additionally will exhibit heat stability.

The preferred method for effecting dehydration in the manner generally described above involves the use of a conventional rotary double drum dryer of the type generally illustrated in the accompanying drawing. Such an apparatus consists of two horizontal heated cylinders rotating in opposite directions. In the operation thereof, the amine oxide solution is poured slowly into the trough formed by the juxtaposed cylindrical rolls. The rolls are suitably spaced so that a thin film of solution is applied to each roll from the reservoir of solution as the rolls rotate. The speed of suitably sized rolls is so adjusted as to result in the contemplated degree of evaporation during less than one rotation of the cylinders, thus leaving a dry film of amine oxide which is continuously removed therefrom by scraper knives. As indicated previously, satisfactory drying temperatures for the drum drying operation carried out under atmospheric pressure is between about 210°–280° F.

In order to illustrate this invention further, the following specific examples are set forth. As indicated, these examples are given primarily for the purpose of illustration and accordingly, any enumeration of details contained therein should not be interpreted as a limitation upon the invention except as such is expressed in the appended claims.

EXAMPLE I

A dilute aqueous solution of dimethyltetradecyl amine oxide was slowly poured between the rolls of a Stokes double drum dryer. The drum surface temperature was maintained at 250° F. by suitably regulating the pressure of the steam fed to the drums. After about one revolution, the product was removed from the rolls by scraper knives. The compositions of the aqueous solution and the dried product are as follows:

|  | Solution, percent | Dry Product, percent |
|---|---|---|
| Amine oxide | 26.4 | 84.5 |
| Amine | 0.72 | 1.9 |
| Water | 70.13 | 5.61 |
| Sodium sulfate | 2.75 | 7.99 |
| Tetradecene | 0.00 | 0.00 |

The dry product was a free-flowing, white wax-like material which could be readily sized for blending with other components to produce a dry heavy-duty detergent composition. The data given above show 0.87 mole of water per mole of amine oxide in a dry product. These data also indicate that no measurable loss of amine or amine oxide had occurred during the drying operation.

EXAMPLE II

A dilute solution of dimethyloctadecyl amine oxide was drum dried at 250° F. as in Example I. The compositions of the solution and the dehydrated product thereof are as follows:

|  | Solution, percent | Dry Product, percent |
|---|---|---|
| Amine oxide | 27.9 | 79.8 |
| Amine | 1.6 | 10.8 |
| Ethanol | 26.41 | -------- |
| Water | 43.37 | 7.2 |
| Sodium sulfate | 0.72 | 2.22 |
| Octadecane | 0.00 | 0.00 |

The above data show 1.6 moles of water (by difference) per mole of amine oxide. Since part of the 7.2 percent reported as water is undoubtedly ethanol, the actual ratio of water to amine oxide is closer to an equimolar one.

The above data also show a small loss of amine oxide and a small increase in amine concentration; however the loss experienced is a commercially tolerable one. The dry product was a dry, flaky solid very similar to the dry product of Example I.

EXAMPLE III

A dilute aqueous solution of dimethyldodecyl amine oxide was dried in a manner identical to that employed in Example I. The compositions of the solution and the dried product are as follows:

|  | Solution, percent | Dry Product, percent |
|---|---|---|
| Amine oxide | 31.7 | 76.6 |
| Amine | 1.0 | 6.2 |
| Water | 62.98 | 7.0 |
| Sodium sulfate | 4.32 | 10.2 |
| Dodecene | 0.00 | 0.00 |

The above data show there to be 1.16 moles of water per mole of amine oxide in the dry product. No ascertainable loss of amine oxide or amine had occurred in this run. The dry product had physical properties comparable to the products obtained in the previous examples.

EXAMPLE IV

The solution employed in Example III was drum dried on a Stokes double drum dryer of which the surface of the rolls was maintained at 325° F. Employing an elevated temperature of this magnitude would not permit adequate control of the drying operation as there was much smoking, bubbling and apparent decomposition occurring. Some product in a form of a dark brown oil or grease was recovered from the roll and analyzed. The analysis showed the following composition:

| | Percent |
|---|---|
| Amine oxide | 36.3 |
| Amine | 4.8 |
| Water | --- |
| Dodecene | 29.0 |
| Sodium sulfate | 29.9 |

What is claimed is:

1. A method for drying an aqueous solution of a detergent grade aliphatic tertiary amine oxide which comprises applying a film-like layer of the solution onto an extended surface heated to a temperature of from about 210 to 280° F., and maintaining such heat transfer relationship until the resultant dried product contains about one mol of water per mol of amine oxide.

2. A method for drying an aqueous solution of a teritary amine oxide of the formula:

$$R_1R_2R_3N \rightarrow O$$

in which $R_1$ is a linear alkyl group having from about 10–16 carbon atoms and in which $R_2$ and $R_3$ are each selected from the group consisting of methyl and ethyl radicals, which comprises applying a film-like layer of said solution onto an extended surface, heated to a temperature of from about 210–280° F., and maintaining such heat transfer relationship until the resultant dried product contains about one mol of water per mol of amine oxide.

3. A method for drying an aqueous solution of a tertiary amine oxide of the formula:

$$R_1R_2R_3N \rightarrow O$$

in which $R_1$ is a linear alkyl group having from about 10–16 carbon atoms and in which $R_2$ and $R_3$ are each selected from the group consisting of methyl and ethyl radicals, which comprises drum drying said solution under atmospheric pressure and at a temperature between about 210 and 280° F. to the extent of forming about a monohydrate of the amine oxide, and thereupon removing the dehydrated amine oxide from the drum surface.

4. A process in accordance with claim 3 wherein said amine oxide is dimethyldecyl amine oxide.

5. A process in accordance with claim 4 wherein said amine oxide is dimethyldodecyl amine oxide.

6. A process in accordance with claim 4 wherein said amine oxide is dimethyltetradecyl amine oxide.

7. A process in accordance with claim 4 wherein said amine oxide is dimethylhexadecyl amine oxide.

References Cited

UNITED STATES PATENTS

| 2,087,788 | 7/1937 | Thal | 159—49 |
| 2,330,922 | 10/1943 | Riegler | 18—47.5 |
| 2,812,018 | 11/1957 | Heald et al. | 159—49 |
| 2,944,977 | 7/1960 | Compa | 252—121 |
| 3,085,982 | 4/1963 | Steer et al. | 252—138 X |
| 3,267,147 | 8/1966 | Sheeran | 252—152 X |
| 3,275,673 | 9/1966 | Barlow | 252—152 X |

OTHER REFERENCES

Synthetic detergents: "Soap and Chemical Specialties," July 1955, pp. 50–61.

NORMAN YUDKOFF, *Primary Examiner.*

J. SOFER, *Assistant Examiner.*